United States Patent [19]

Stone et al.

[11] Patent Number: 4,501,424
[45] Date of Patent: Feb. 26, 1985

[54] MANUAL CONTROLLER FOR VIDEO SYSTEM

[75] Inventors: George C. Stone; Stuart E. Ross, both of Stamford, Conn.

[73] Assignee: CBS Inc., New York, N.Y.

[21] Appl. No.: 505,515

[22] Filed: Jun. 17, 1983

[51] Int. Cl.³ .................. A63F 9/22; H01H 13/08; H01H 21/10; H01H 3/02

[52] U.S. Cl. .................. 273/148 B; 200/6 A; 200/157; 200/17 R; 200/330

[58] Field of Search .............. 200/6 A, 157, 332, 330, 200/329, 335; 273/148 B, DIG. 28; 340/709, 710

[56] References Cited

U.S. PATENT DOCUMENTS

| | | | |
|---|---|---|---|
| 1,931,775 | 10/1933 | Stafak | 200/61.28 |
| 2,754,505 | 7/1956 | Kenyon | 74/471 XY X |
| 2,885,163 | 5/1959 | De Haven | 74/471 XY X |
| 3,971,902 | 7/1976 | Wulf et al. | 220/159 A X |
| 4,350,055 | 9/1982 | Pinomäki | 74/471 XY |
| 4,425,488 | 1/1984 | Moskin et al. | 200/220 |

Primary Examiner—Richard C. Pinkham
Assistant Examiner—Scott L. Brown
Attorney, Agent, or Firm—Spencer E. Olson

[57] ABSTRACT

An adapter is disclosed which is applicable for use in conjunction with a video game controller system. The disclosed adapter increases the manual inputs that can be communicated from one of the manual controller units to the video game controller system. The adapter comprises a shell opened at one end and adapted to fit over and envelop the joystick member such that the joystick member can be moved by manually moving the shell. A switch is mounted in the shell, and a conductor is provided for coupling the contacts of the switch to elements of an auxiliary connector. The auxiliary connector is adapted for coupling to an input port of the video game controller system. The auxiliary connector includes an auxiliary input port for receiving the connector of the respective manual controller unit. In this embodiment, the shell is pistol-grip shaped, the first-mentioned switch comprises a thumb-activated switch mounted at the other end of the shell, and the second switch comprises a finger-activated switch located at a finger indentation position of the shell.

22 Claims, 6 Drawing Figures

MANUAL CONTROLLER FOR VIDEO SYSTEM

BACKGROUND OF THE INVENTION

This invention relates to manual input devices for video control and, more particularly, to improvements in so-called "joystick" devices for use in conjunction with video game controllers.

Video game controller systems generally require manual inputs from the person playing the game. The most common manual controller input device is a unit which includes a manually pivotable member and is known as a "joystick" unit. Typically, the joystick unit includes a base enclosure in which one end of an elongated joystick member is pivotally mounted, and a number of switches which are caused to be closed at different angular positions of the joystick member. In the most prevalent type of joystick unit there are four orthogonally positioned compression switches. Either a single one of these switches or two adjacent switches can be closed at once, so output information concerning the status of the four switches conveys eight possible angular position indications. The most prevalent joystick unit also includes a switch mounted in the base enclosure, this switch typically being a button switch that is operated by the hand of the operator that is not busy operating the joystick member. A cable which includes conductors from the various switches passes through an aperture in the base enclosure of the joystick unit and terminates in a connector that is adapted for coupling to an input port of the video game controller system. The controller system may be a general or special purpose processor unit that is designed exclusively for video game use, or may be a general purpose computer or processor of any type.

The most prevalent video game controller system console has two input ports which respectively receive the connectors from two identical joystick units. When a video game is played by two players, each player typically uses one of the joystick units, and the video game controller system interrogates, at appropriate intervals, the statuses of the switches of the joystick units, these switches defining the player's manual inputs. Some video games are adapted for play, if desired, by a single player. Typically, in such case, one of the system console input ports is active, and the player uses one of the joystick units to control play via the active input port.

In various video games it would be desirable to have additional modes of manual input to control aspects of the game. For example, if the joystick pivot position is used to define direction of a vehicle, and the joystick button switch is used to fire a projectile from the vehicle, it may be desirable to have additional manual input from the player that defines velocity or acceleration of the vehicle or projectile, or rotation, transposition, or other motion-defining parameters. Inputs by which the operator changes status or conditions that are not necessarily motion-related might also be useful to have in a particular game, for example inputs which set a time clock running, alter a time base, or change the status of a scoring system. From the standpoint of designing video game software, full flexibility for these modes of control is generally available. A limiting factor, however, is the nature of the joystick unit itself which generally includes only a single button switch and the joystick member.

It is known that joystick units can be provided with additional switches. However, since a large percentage of game software developed must, to be practical, be compatible with the most prevalent type of video game controller system purchased by consumers, the software must necessarily take into account the limitation on the number and type of operator manual inputs that can be obtained from the joystick units that come with the video game controller systems.

It is among the objects of the present invention to provide an improved joystick unit that allows greater operator flexibility for manual control of video games. It is also an object of the present invention to provide an adapter which can be inexpensively produced and readily connected to a conventional joystick unit to obtain an adapted joystick unit that provides compatible inputs to a conventional video game controller system.

SUMMARY OF THE INVENTION

The present invention is applicable for use in conjunction with a video game controller system which includes a pair of input ports, each being adapted for coupling to a manual controller unit which includes a base enclosure, a joystick member pivotally mounted at one end thereof in the base enclosure, and means for producing indications representative of the pivot position of the joystick member, these indications typically being switch closures or openings. A cable and connector are typically used for communicating the indications to the video game controller system when the connector is coupled to one of the system's input ports.

A form of the invention pertains to an adapter for the manual controller unit for increasing the manual inputs that can be communicated from a manual controller unit to the video game controller system. An adapter can be provided for each of the manual controller units. The adapter comprises a shell opened at one end and adapted to fit over and envelop the joystick member of its respective manual controller unit such that the joystick member can be moved by manually moving the shell. A switch is mounted in the shell, and conductive means are provided for coupling the contacts of the switch to elements of an auxiliary connector. The auxiliary connector is adapted for coupling to an input port of the video game controller system. In a form of the invention, the auxiliary connector includes an auxiliary input port for receiving the connector of the respective manual controller unit. In this manner, each manual controller unit, with an adapter and its auxiliary connector in place, can be used to convey adapter switch information, as well as joystick member pivot position indications, from a player to the video game controller system.

In a preferred embodiment of the adapter hereof, a second switch is mounted in the shell and further conductive means are provided for coupling the contacts of the second switch to elements of the auxiliary conductor. In this embodiment, the shell is pistol-grip shaped, the first-mentioned switch comprises a thumb-activated switch mounted at the other end of the shell, and the second switch comprises a finger-activated switch located at a finger indentation position of the shell. Also, in this embodiment, the thumb-activated switch and the finger-activated switch are biased to normally open positions by opposite ends of a single spring.

Further features and advantages of the invention will become more readily apparent from the following de-

DESCRIPTION OF THE PREFERRED EMBODIMENT

Figure 1:
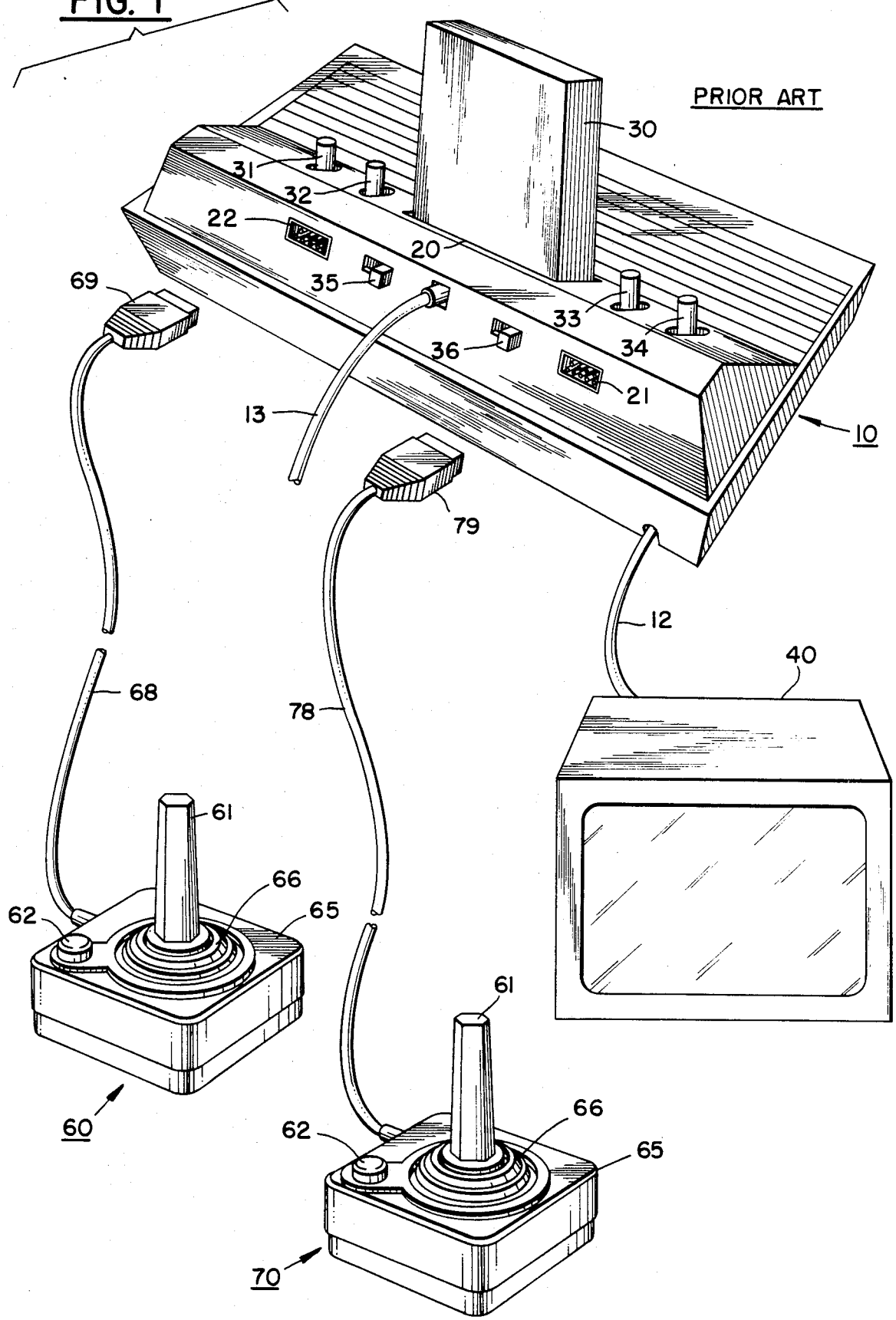
FIG. 1 is a diagram, partially in block form, of a prior art video game system.

Referring to FIG. 1, there is shown a diagram of prior art video game apparatus which includes a console 10 containing a microprocessor and having a receptacle 20 for receiving a program cartridge 30. The console 10 has a video output cable 12 that is coupleable to a television display 40. A power supply cable 13 is coupleable to a source of power (not shown). The console also includes a pair of input port connectors 21 and 22 which receive connectors from respective left and right manual controller joystick units 60 and 70 that are used for player control of video games. The console is also typically provided with various control switches 31–36 for such functions as on/off, resetting a game, selecting a game, or setting game difficulty levels. The joystick units are typically of the kind described in the Background portion hereof. The video game apparatus may be, for example, of the type made and sold by Atari, Inc. under the name "Video Computer System-2600", which is currently the most prevalent type of video game apparatus. However, it will be understood that the principles of the invention apply to various other types of video game systems, computers, processors, or other equipments which require operator manual inputs. The compatability of the present embodiment with the most prevalent types of existing hardware is considered to be particularly advantageous.

When playing a video game designed for simultaneous or sequential play by two players, both joystick units are typically used, wherein if the video game is designed for play by a single player, only one joystick is typically used. The joystick units 60 and 70 each include four switches, as described in the Background portion hereof, that are activated by a joystick member 61 pivotally mounted in the base 65 of the respective units (60, 70). A resilient boot 66 surrounds the member 61 where it enters the base enclosure 65. A button switch 62 in the enclosure 65 is activated by the player's other hand; i.e., the hand not operating the joystick member. The statuses of the five switches of each joystick unit are interrogated by the processor in the console 10 via conductors in cables 68 and 78. These conductors are coupled to the console through connectors 69 and 79, and the port connectors 22 and 21, respectively.

Figure 2:
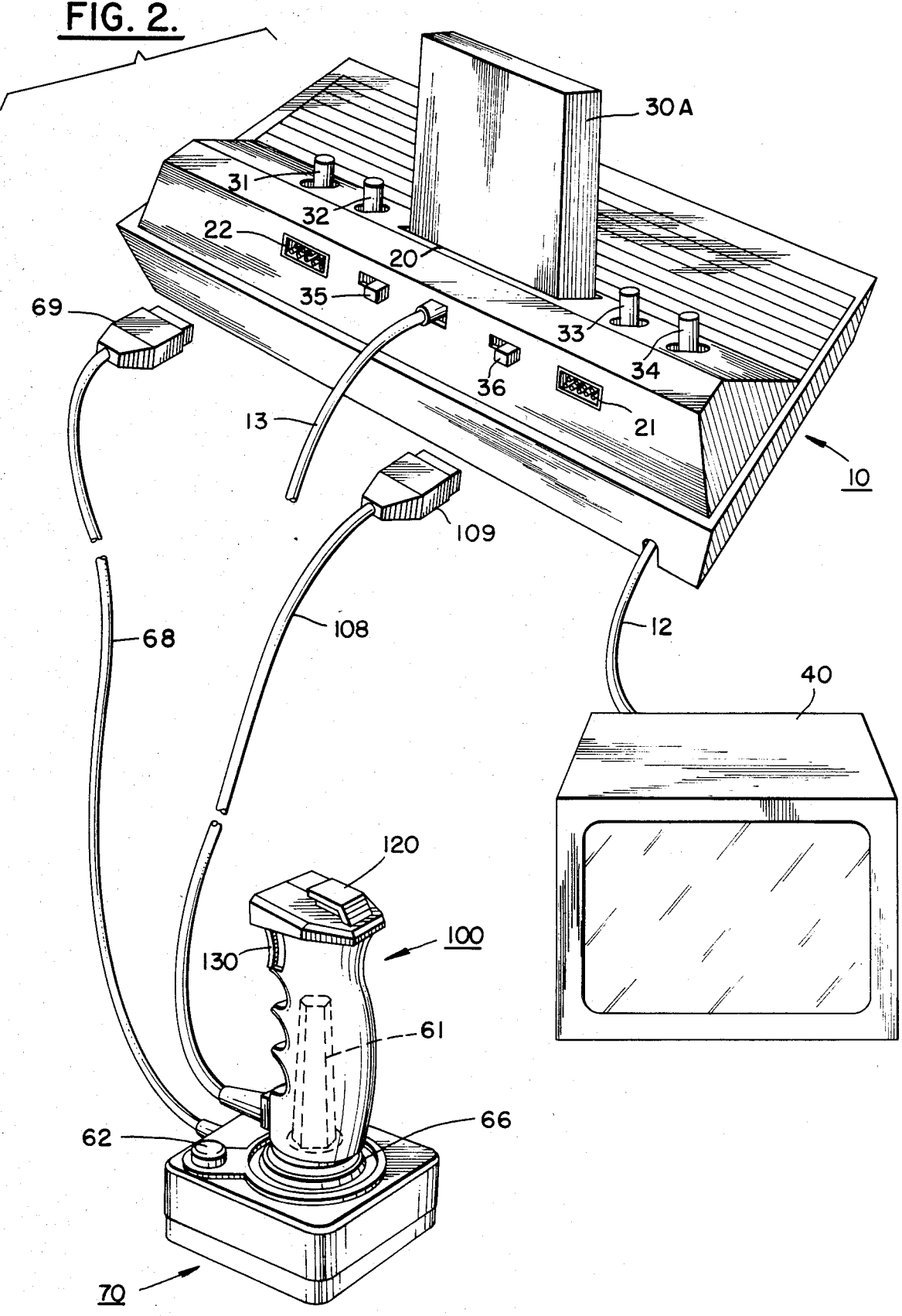
FIG. 2 is a diagram, partially in block form, of a video game system, adapted in accordance with an embodiment of the invention, for use by a single player at a time.

FIG. 2 illustrates the system of FIG. 1, as modified using a joystick adapter improvement in accordance with an embodiment of the invention. The console 10 and display 40 are as they were in FIG. 1. A single joystick unit, such as unit 60 of FIG. 1, includes an adapter 100 in accordance with the invention, the adapter being described in further detail in conjunction with FIGS. 3 and 4. The conventional cable 68 and connector 69 from the joystick unit 60 couple to the input port 22 of the console 10, as in FIG. 1. The other input port 21 of console 10 receives, in this case, a conventional connector 109 at the end of a cable 108 which comes from adapter 100. Accordingly, it is seen that the adapted joystick unit is for use, in this embodiment, in conjunction with a video game in which one player at a time is conveying manual inputs to the console. The program software of the game cassette 30A in receptacle 20, in addition to being responsive to the conventional manual controller inputs via cable 68, is responsive to the switch inputs conveyed via conductors in cable 108, these inputs being indicative of the statuses of a thumb switch 120 and an index finger switch 130 that are built into adapter 100. The program software is readily designed to be responsive to the status of these switches in the adapter.

Figure 3:
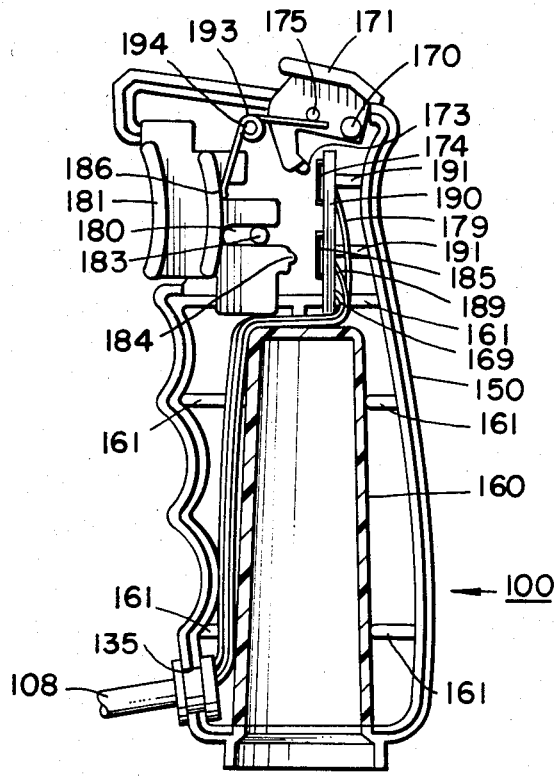
FIG. 3 is a cross-sectional view of the adapter of the FIG. 2 embodiment, with its switches opened.

Referring to FIG. 3, there is shown a cross-sectional view of the adapter 100 which fits over the joystick member 61 of the conventional joystick unit 60. In the present embodiment, the adapter 100 is a molded plastic hollow outer shell 150 having a pistol-grip type of exterior contour. The inner region of adapter 100 contains a receptacle 160 supported by ribs 161 and proportioned to fit over and grip the joystick member 61. The pivot motion of joystick member 61 therefore coincides with the pivot motion of adapter 100.

Figure 4:
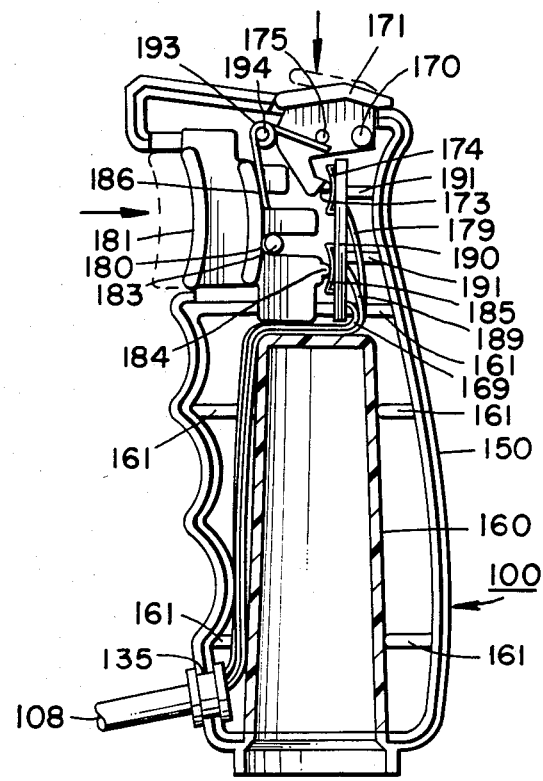
FIG. 4 is a cross-sectional view of the adapter of the FIG. 2, with its switches closed.

In the present embodiment, a switch actuator 171 is positioned at the upper end of adapter shell 150 and is pivotally mounted on an integrally molded dowel 170 that is supported in and extends between recesses formed in opposite interior walls of the shell. The switch actuator 171 preferably is formed of plastic and has a downwardly extending curved arm that terminates at its lower extremity in a nub 173 which confronts a first contact plate 174 of a membrane-type switch consisting of a vertically oriented printed circuit board 190 having two pairs of spatially separated conductive foils deposited thereon. Each contact plate and a cooperating portion of the conductive foil beneath it constitutes a normally open single-pole, single-throw switch. A conductor 169 common to the two switches, and conductors 171 and 189 connected to respective normally open contacts of the two switches, are coupled within cable 108 through an aperture 135 in the housing 150. The conductors are appropriately coupled to predetermined pins of connector 109 (FIG. 2) and the conductor common to the two switches feeds a signal to the microprocessor in the console when a contact plate bridges its respective foil conductors. The circuit board 190 is rigidly held in vertically oriented slots formed in opposing interior walls of shell 150 and is further supported by a pair of ribs 191, and a wire spring 193 mounted on a fixed dowel 194 that extends between opposite interior walls of the shell 150 biases switch actuator 171 upwardly by pressing against an integral nub 175 so that the nub 173 is spaced from contact plate 174. When thumb pressure is applied to the top of actuator 171, it rotates on dowel 170, and nub 173 is pressed against contact plate 174, as shown in FIG. 4, causing it to deflect and bridge its associated switch contacts. Upon release of thumb pressure, the actuator is returned to its normal position by wire spring 193, and contact plate 174 springs back to its normally open position.

A second contact plate 185 of the membrane switch is positioned to be actuated by a second switch actuator 181 that is positioned at the uppermost finger grip indentation of shell 150 for convenient actuation by the index finger of the user. The actuator 181 preferably is a unitary molded plastic part shaped to be horizontally slideable on mating surfaces formed on shell 150 and includes a slot 180 for guiding the actuator over a stationary dowel 180 that extends between opposite interior walls of the shell. At the innermost end of and below slot 180 the switch actuator 181 is formed with a nub 185 that confronts and is adapted to cause contact plate 185 to close its switch contacts. The spring 193 presses against an inwardly directed curved surface 186 to bias actuator 181 outwardly to a normally open position. When finger pressure is applied to the curved outer surface of actuator 181, it slides horizontally to the position shown in FIG. 4 at which the nub 184 is pressed against contact plate 185 to cause it to deflect and bridge its associated switch contacts. When released, the actuator 181 is returned to its normal position by spring 193, and switch contact plate 185 springs back to its normally open positon.

Switch actuators 171 and 181 are so disposed within the shell 150 that they can be individually operated, or both operated at the same time as illustrated in FIG. 4, without interfering one with the other.

It will be appreciated that the game software provided for play on a video game employing the adapted joystick unit in accordance with the embodiment hereof can be provided with two additional manual control modes; i.e., those activated by the thumb switch 171 and the index finger switch 181. Thus, additional interest and action can be designed into video games, and controlled from a player's main hand.

Figure 5:
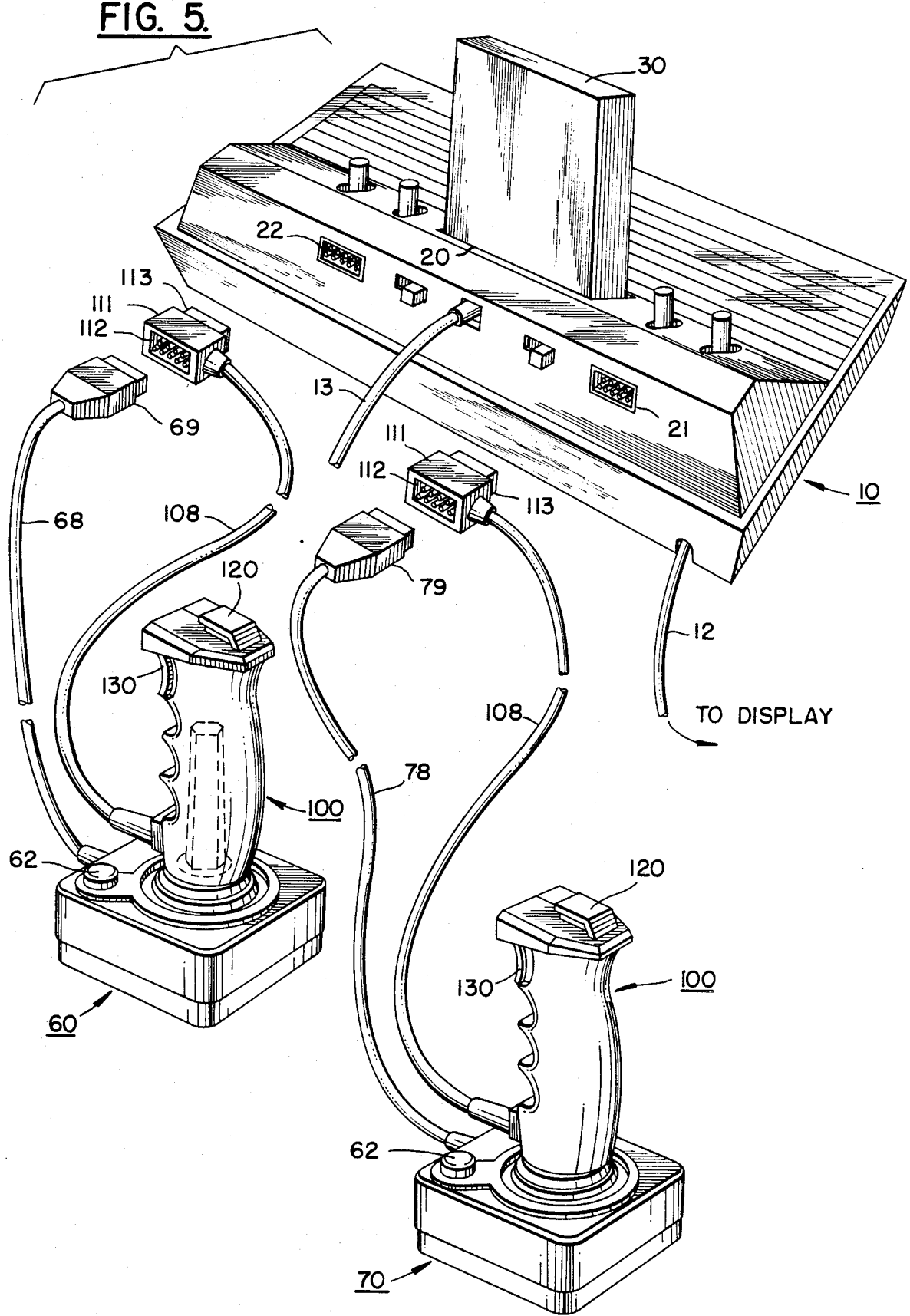
FIG. 5 is a diagram, partially in block form, of a video game system, adapted in accordance with another embodiment of the invention, for use by two players at a time.

Referring to FIG. 5, there is shown an embodiment of the present invention wherein each of the two conventional manual controller joystick units 60 and 70 is provided with an adapter 100. An important feature of this embodiment is that the outputs from each adapted unit can be received at a single input port of the console 10, so that games can be designed for play by two players simultaneously, with each player having the additional thumb switch and finger switch controls, as described above. Compatibility with the most prevalent video game console and manual controller joystick units is again provided.

In the embodiment of FIG. 5 the three wires from each adapter 100 are coupled via cable 108 to an auxiliary connector 111 which, in the present embodiment, has a socket portion 112 adapted to receive the conventional connector 69 or 79 from the manual controller joystick unit 60 or 70. Each connector 111 also has a plug portion 113 which is in the same general configuration as the conventional plug connector 69 or 79 (FIG. 1), so that the connector 111 can be plugged into the input port 21 or 22, respectively, of the console 10.

Figure 6:
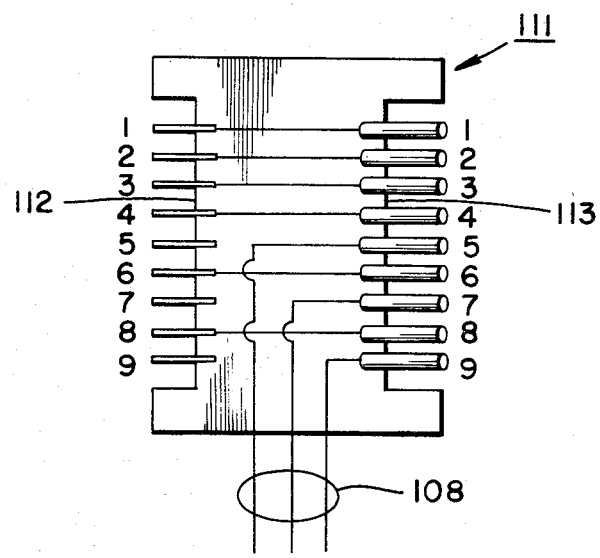
FIG. 6 is a diagram illustrating the pin connection arrangement of the auxiliary connector of the FIG. 5 embodiment.

The pin connection arrangement of the connector 111 is shown in FIG. 6. The pins 1–4, 6 and 8 of receptable portion 112 are directly coupled to corresponding pin receptacles 1–4, 6 and 8 of plug portion 113. These pins and receptacles are at positions corresponding to the pins that are used in conventional connector 69 or 79 and console port 21 or 22 to convey the conventional joystick switch and button switch statuses from the manual controller joystick units 60 and 70 to the console 10. Accordingly, with regard to these conventional pin connections, the auxiliary connector 111 serves to couple each wire of the conventional cable 68 or 78 to the appropriate pin positions of an input port in the same manner as if the connector 69 or 79 was conventionally coupled to its respective input port. The three wires in the cable 108 from adapter 100 are respectively coupled to pin receptacles 5, 7, and 9 of the plug portion 113, so that when auxiliary connector 111 is plugged in, these three wires are respectively coupled to the pin positions 5, 7, and 9 of the input port 21 or 22. In the conventional manual controller of the most prevalent video game system, the pins 5, 7 and 9 normally are not utilized, since the four joystick position switches and button switch require only one wire per switch, and a ground. Accordingly, in the present embodiment, these pin positions can be utilized to convey the statuses of the thumb and finger switches of the adapter to the console, and the video game software for use in conjunction with the adapted manual controllers can be designed to appropriately interrogate the additional pin positions.

In the set-up of FIG. 5, each of the manual controllers is illustrated as being provided with an adapter, adapter cable, and auxiliary connector so that two-player games can be played with the added flexibility of the thumb switch and finger switch available for operator control by both players. It will be understood, however, that, if desired, a single joystick adapter of the type illustrated in FIGS. 3 and 4 can be used for single player or one-player-at-a-time in conjunction with the auxiliary connector 113 of FIG. 6. A further variation thereof would utilize in one input port a single adapter in conjunction with one of the conventional manual controllers with an auxiliary connector as in FIG. 5 and 6, and a conventional manual controller in the other input port.

The invention has been described with reference to specific embodiments, but variations within the spirit and scope of the invention will occur to those skilled in the art. For example, it will be recognized that the adapter shell may have a different internal or external shape than that described in the present embodiment.

We claim:

1. For use in conjunction with a video game controller system which includes a pair of input ports, each being adapted for coupling to a manual controller unit which includes a base enclosure, a joystick member pivotally mounted at one end thereof in the base enclosure, means for producing indications representative of the pivot position of said joystick member, and means including a cable and connector for communicating joystick member pivot position indications to said controller system when said connector is coupled to an input port; an adapter for increasing the manual inputs that can be communicated from a manual controller unit to said video game controller system, comprising:

a shell open at one end and adapted to fit over and envelop said joystick member, such that said joystick member can be moved by manually moving said shell;

a switch mounted in said shell;

an auxiliary connector adapted for coupling to an input port of said video game controller system; and conductive means for coupling the contacts of said switch to elements of said auxiliary connector;

whereby said manual controller unit with said adapter can be used to convey adapter switch information, as well as joystick member pivot position indications, from a player to the video game controller system.

2. The adapter as defined by claim 1, wherein said auxiliary connector includes an auxiliary input port for receiving the connector of the manual controller unit, such that joystick member pivot position indications, as well as adapter switch information, is coupled through said auxiliary connector to said input port.

3. The adapter as defined by claim 2, further comprising a second switch mounted in said shell and further conductive means for coupling the contacts of said second switch to elements of said auxiliary connector.

4. The adapter as defined by claim 3, wherein said conductive means and further conductive means comprise wires passing through an opening in said adapter shell.

5. The adapter as defined by claim 3, wherein said switch is activated by a thumb-operated switch actuator mounted at the other end of said shell.

6. The adapter as defined by claim 5, wherein said shell is pistol-grip shaped with finger indentations, and wherein said second switch is activated by a finger-operated switch actuator located at a finger indentation position.

7. The adapter as defined by claim 6, wherein said thumb-operated switch actuator and said finger-operated switch actuator are both biased to normally inactive positions by opposite ends of a single wire spring.

8. The adapter as defined by claim 6, wherein said thumb-activated switch and said finger-activated switch are membrane-type switches mounted on a common printed circuit board.

9. The adapter as defined by claim 6, wherein said manual controller unit includes a button switch on said base enclosure, said button switch being coupled to said first connector via said cable.

10. The adapter as defined by claim 1, wherein said connector is coupleable to one of the pair of input ports and said auxiliary connector is coupleable to the other of said input ports.

11. The adapter as defined by claim 10, further comprising a second switch mounted in said shell and further conductive means for coupling the contacts of said second switch to elements of said auxiliary connector.

12. The adapter as defined by claim 11, wherein said switch is activated by a thumb-operated switch actuator mounted at the other end of said shell.

13. The adapter as defined by claim 12, wherein said conductive means and further conductive means comprise wires passing through an opening in said adapter shell.

14. The adapter as defined by claim 12, wherein said shell is pistol-grip shaped with finger indentations, and wherein said second switch is finger-operated by a switch actuator located at a finger indentation position.

15. The adapter as defined by claim 14, wherein said thumb-operated switch actuator and said finger-operated switch actuator are both biased to normally inactive positions by opposite ends of a single wire spring.

16. The adapter as defined by claim 14, wherein said thumb-activated switch and said finger-activated switch are membrane-type switches mounted on a common printed circuit board.

17. For use in conjunction with a video game controller system which includes a pair of input ports each adapted for coupling to a manual controller unit which includes a base enclosure, a joystick member pivotally mounted at one end thereof in the base enclosure, means for producing indications representative of the pivot position of said joystick member, and means including a cable and connector for communicating joystick member pivot position indications to said controller system when said connector is coupled to an input port; a pair of adapters for increasing the manual inputs that can be communicated from each of said manual controller units to said video game controller system, each adapter comprising:

a shell open at one end and adapted to fit over and envelop the joystick member of the respective manual controller unit such that said joystick member can be moved by manually moving said shell;
a switch mounted in said shell;
an auxiliary connector adapted for coupling to one of said input ports;
conductive means for coupling the contacts of said switch to elements of said auxiliary connector;
said auxiliary connector including an auxiliary input port for receiving the connector of the respective manual controller unit to couple elements thereof the respective input port;
whereby each of said manual controller units, with its respective adapter can be used to convey adapter switch information, as well as joystick member pivot position indications, from a player to the video game controller system.

18. The adapters as defined by claim 17, wherein each adapter further comprises a second switch mounted in said shell and further conductive means for coupling the contacts of said second switch to elements of said auxiliary connector.

19. The adapters as defined by claim 18, wherein said switch is activated by a thumb-operated switch actuator mounted at the other end of said shell.

20. The adapters as defined by claim 19, wherein said shell is pistol-grip shaped with finger indentations, and wherein said second switch is activated by a finger-operated switch actuator located at a finger indentation position.

21. The adapters as defined by claim 20, wherein said thumb-operated switch actuator and said finger-operated switch actuator are both biased to normally inactive positions by opposite ends of a single wire spring.

22. The adapters as defined by claim 20, wherein said thumb-operated switch and said finger-operated switch are membrane-type switches mounted on a common printed circuit board.

* * * * *